United States Patent Office 2,878,852
Patented Mar. 24, 1959

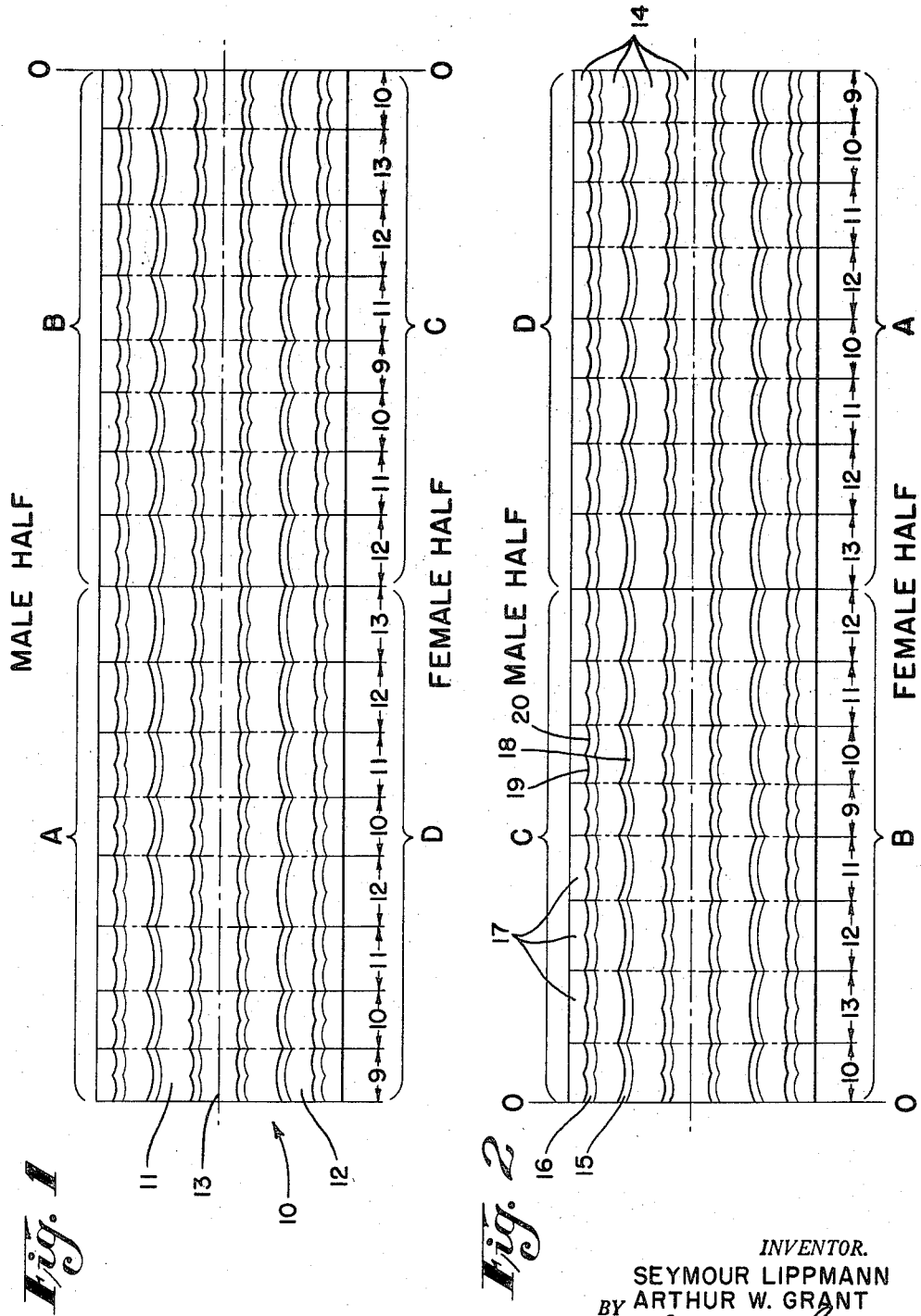

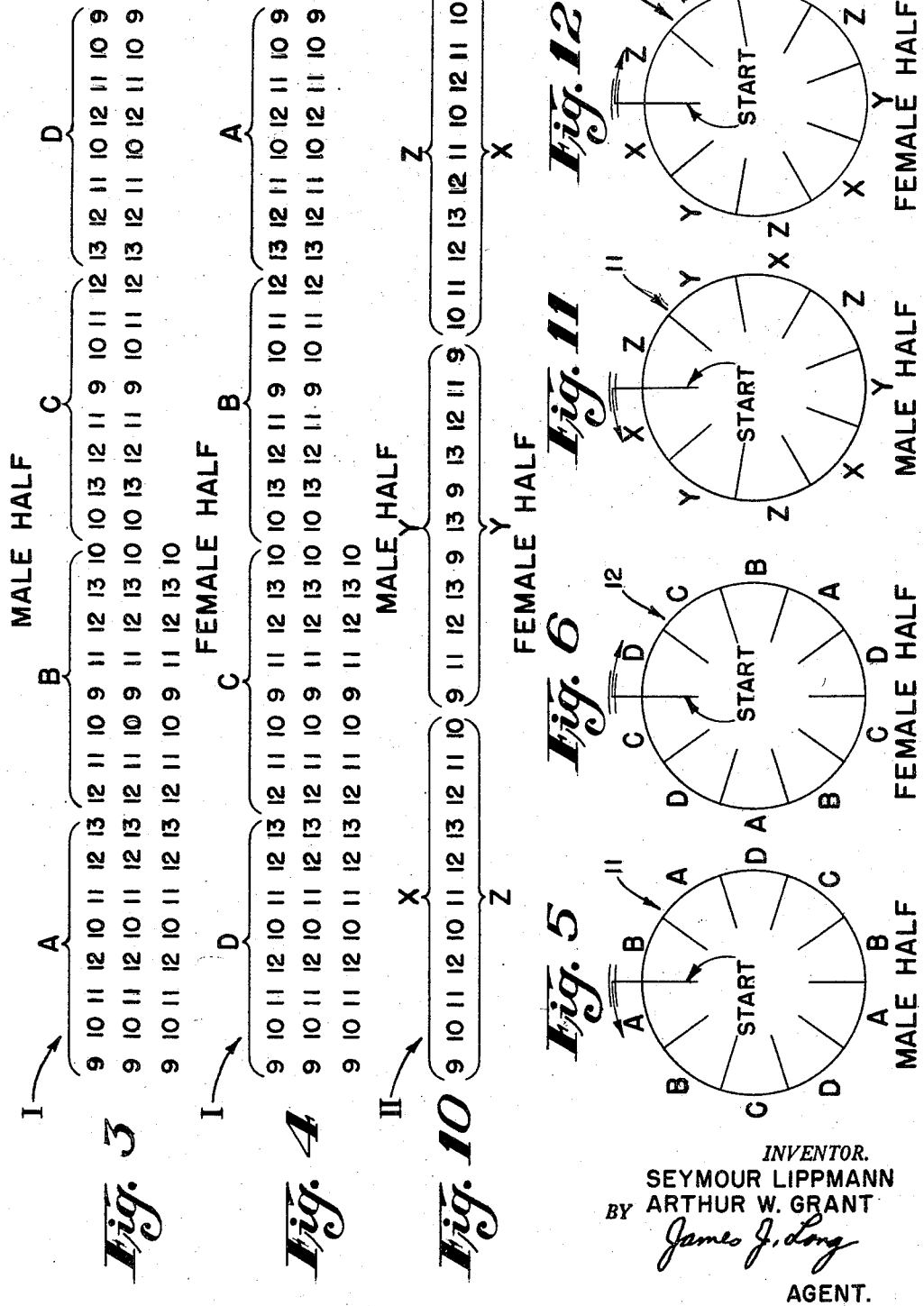

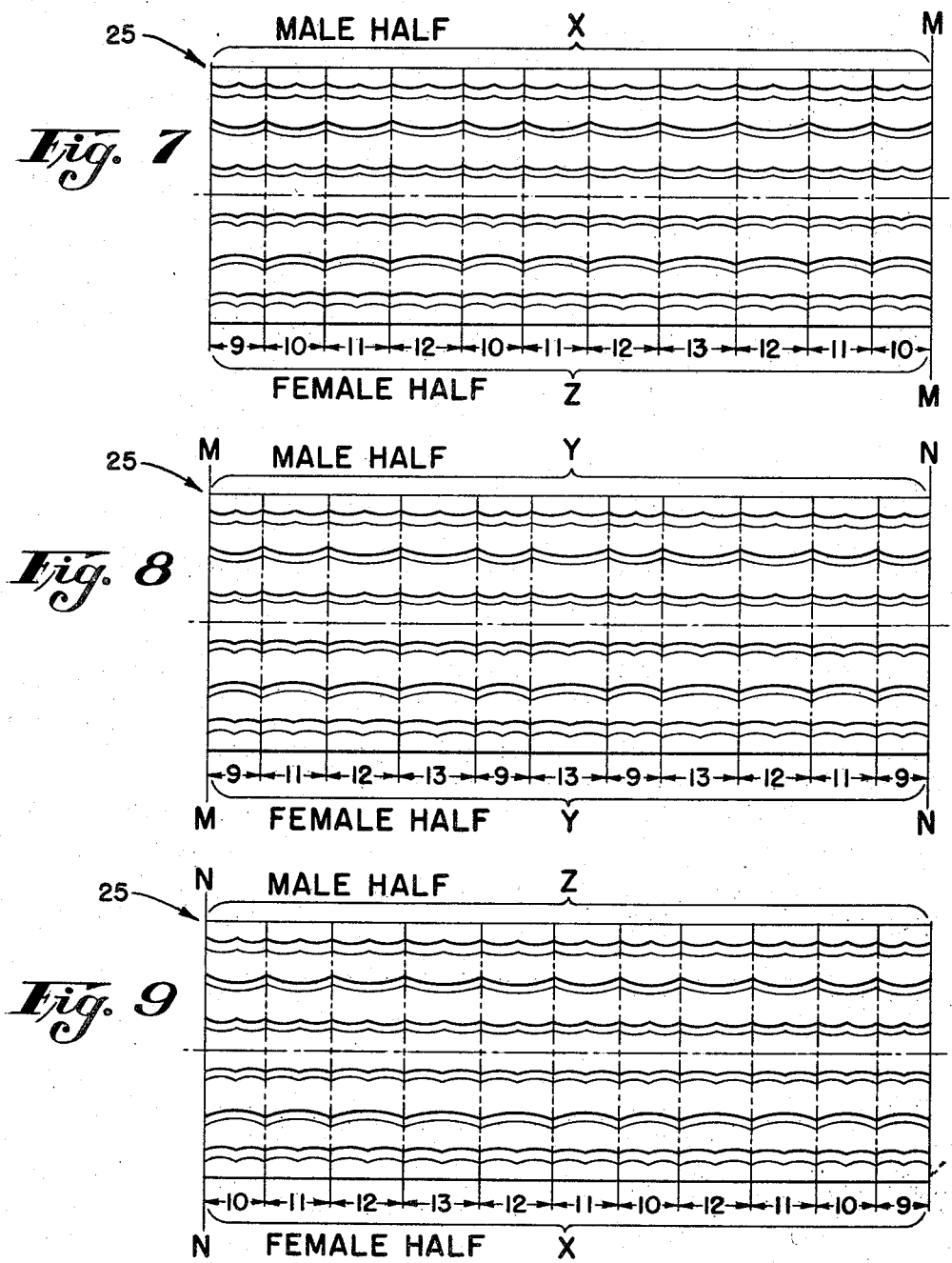

2,878,852

PNEUMATIC TIRE HAVING NOISELESS TREAD

Seymour Lippmann and Arthur W. Grant, Detroit, Mich., assignors to United States Rubber Company, New York, N.Y., a corporation of New Jersey Application November 15, 1955, Serial No. 546,938

5 Claims. (Cl. 152—209)

This invention relates to a pneumatic tire having a tread pattern so constructed as to greatly reduce any objectionable impression of noise emanating from the tire when the tire is in use. More particularly the invention relates to a tire having a tread pattern of the foregoing kind, which is so arranged as to make is possible to mold the tire in a most economically constructed mold.

A typical tire of the invention embodies a tread pattern comprised basically of a plurality of circumferentially extending ribs, formed of successive repeating units which represent definite more or less transverse divisions or interruptions of such ribs. Such transverse divisions or interruptions serve to increase the traction of the tire and they constitute an anti-skid pattern that may be the same or different in each rib, and may be the same or different on each side of a given rib. Typical transverse divisions or interruptions may be represented, for example, by blocks formed in the ribs, or by partial or complete slots or slits formed in the ribs, or by curved walls of the ribs, or by knobs, or other rectilinear or curvilinear distortions or embellishments of the ribs, or any other desired repeating forms. The tread pattern formed in this manner is believed to be associated, in a manner that has not heretofore been completely understood, with the kind and intensity of sound produced by the tire when in use.

It has previously been proposed, as, for example, in the Ewart et al. United States Patent 2,006,197, issued June 25, 1935, to minimize the sound emanating from the tire in use by proportioning the units of the tread pattern in accordance with a particular sequence. However, the kind of sequence disclosed in this patent, and elsewhere in the prior art, unfortunately did not provide as great a reduction in noise as would be desirable, and there has therefore been a continuing demand to reduce the objectionable noise produced by ordinary tires in use. Also, the sequences previously proposed for the reduction of noise, purely aside from the fact that they were only of limited effectiveness, were furthermore objectionable from the standpoint of requiring the tire mold to be constructed in a comparatively expensive manner, either by engraving the entire tread portion of the mold, which is an uneconomical procedure, or else by casting the mold from many dissimilar segmental patterns, which is an expensive procedure that largely vitiates the otherwise economical aspect of the casting method of making tire molds.

In accordance with the invention, the circumferential length of the repeating units of the tread pattern is varied in accordance with a particular unobvious and novel sequence, with the unexpected result that the apparent noise created by the tire in use in greatly reduced. Such sequence, which is termed a "pitch sequence" because of its relation to the sound produced by the tire, may be expressed by a series of numbers which represent the relative length of the successive units. Thus, it has been discovered that a particularly favorable pitch sequence in accordance with the invention is that represented by the series of relative circumferential distances: 9, 10, 11, 12, 10, 11, 12, 13, 12, 11, 10, 9, 11, 12, 13, 10, 10, 13, 12, 11, 9, 10, 11, 12, 13, 12, 11, 10, 12, 11, 10, 9. (This pitch sequence will hereinafter be referred to as "pitch sequence I"). It will be understood that these numbers represent the relative circumferential length of successive tread units expressed in any desired measuring units, such as tenths of an inch, millimeters, etc., and the sequence is repeated as many times as necessary to completely encircle the tire tread. Another novel and unobvious pitch sequence that has surprisingly been found to result in an unexpectedly low noise level is the following: 9, 10, 11, 12, 10, 11, 12, 13, 12, 11, 10, 9, 11, 12, 13, 9, 13, 9, 13, 12, 11, 9, 10, 11, 12, 13, 12, 11, 10, 12, 11, 10, 9. (This pitch sequence will hereinafter be referred to as "pitch sequence II.")

The basic novel characteristic of the foregoing improved pitch sequences in contrast to the previously suggested pitch sequences, is that the new sequences are substantially devoid of any repeating characteristic such as would enable the human ear to detect a cyclic variation in the character of the sound as the tire revolves. The previously proposed conventional pitch sequences have merely endeavored to prevent any particular pitch of sound from predominating, by varying the length of the tread design units, so that the sound generated would have many different pitches, all more or less tending to interfere with each other. Such "scrambled" pitch sequences did produce a definite reduction in noise, but we have now found that even more remarkable reduction in apparent noise is effected by employing the above-described new sequences, which have been carefully worked out in such manner as to avoid any cyclic recurrence of similar units or similar groups of units, which would result in a cyclic repetition that could be detected by the human ear, and that would be easily remembered. Our invention is based on the avoidance of any subjective impression of noise, rather than purely on an objective diminution in the energy of the sound emanating from the tire, such as would be detectable by a noise level meter.

It is important to note that each of the foregoing pitch sequences is reversible, that is, it reads exactly the same way in either direction.

In accordance with a preferred aspect of the invention, each pitch sequence can be split up into a plurality of groups, each group having a mirror image in the sequence. Thus, in pitch sequence I above, Fig. 3 the first eight numbers, designated group A, are as follows:

(Group A) 9, 10, 11, 12, 10, 11, 12, 13 while the last eight numbers, designated as group D, is as follows:

(Group D) 13, 12, 11, 10, 12, 11, 10, 9

It will be noted that group D is the precise reverse, or mirror image of group A. Similarly, the second eight numbers (group B) in sequence I, Fig. 3 have a mirror image in the third group of eight numbers (group C) of this sequence:

(Group B) 12, 11, 10, 9, 11, 12, 13, 10

(Group C) 10, 13, 12, 11, 9, 10, 11, 12

In pitch sequence II above, the first eleven numbers form a group (X) which is a mirror image of the last group (Z) of eleven numbers as follows:

(Group X) 9, 10, 11, 12, 10, 11, 12, 13, 12, 11, 10

(Group Z) 10, 11, 12, 13, 12, 11, 10, 12, 11, 10, 9

The middle group (Y) is its own mirror image, that is, it is reversible of itself:

(Group Y) 9, 11, 12, 13, 9, 13, 9, 13, 12, 11, 9

The advantage of thus dividing the noise-eliminating pitch sequence into groups which are mirror images of themselves or of other groups lies in the fact that such an arrangement permits the tire to be molded in a mold that is constructed economically with substantial elimination of expensive engraving.

In order to understand why this is so, it is necessary to consider first certain details of the manufacture of tire molds. Among the most economical tire molds are those made of cast segmental sections, usually cast aluminum. Thus, a widely used method of making cast molds is shown, for instance, in U.S. Patent 2,263,001, issued to Gunsalaus et al. on November 18, 1941. In this patented method of making molds, a plaster model (see Fig. 3 of the Gunsalaus patent) is first prepared representing a segment of a trans-axial half of the tire tread. This embodies the desired tread design as a positive replica, and it may be made by hand carving or any other suitable method. Thereafter, a pattern of pliable material is cast from the model. The design on the pliable material is of course a negative replica of the tread design. Thereafter, a plaster core is cast from the pliable pattern, this, again, being a positive replica of the tread design. From this plaster core the final mold segment is cast, this, in turn, being of course a negative replica of the final design of the tire. Enough final mold segments to complete the tread design are made in this manner and assembled (as shown in Fig. 7 of the Gunsalaus patent) to form the finished mold half. Two such halves, one of which is called the male mold half and the other of which is called the female mold half, constitute the complete tire mold.

Because the tires made from the Gunsalaus molds had no pitch sequence, but were simply made up of a uniform repeating design throughout the whole circumference, there was no difficulty about making each mold half from the required number of units of exactly the same segment, and no difficulty about matching the male and female halves, which were identical throughout. In other words, every segment could be cast from exactly the same core piece, and therefore it was necessary to make and process only one original model segment.

When employing the previously known tread pitch sequences, it was not practical to use the Gunsalaus method of making the molds to good advantage, because every segment was different, in both mold halves, and numerous model segments would have to be carved out and processed as described to make a complete mold. The alternative would be to engrave the entire mold, which is an extremely expensive operation.

In accordance with the present invention pitch sequences made up of groups which are mirror images, as described, are utilized in such a way as to make it possible to construct one-half of the tire mold from a minimum number of different segments, these same few segments serving for both the male and the female halves of the mold. The manner in which the invention accomplishes the foregoing, as well as other objects and advantages, will be made clear in the following detailed description, which is intended to be read with reference to the accompanying drawings, wherein:

Figs. 1 and 2 together show, in plan view, a portion of a tire tread embodying one form of the pitch sequence forming the subject matter of this invention;

Figs. 3 and 4 show the pitch sequence divided into four groups or segments of eight units each, and show by the numerals the relative value or size of the units;

Figs. 5 and 6 are diagrammatic illustrations of the manner in which the pitch sequence groups are arranged as segments in the male and female halves of the mold;

Figs. 7, 8 and 9 are similar to Figs. 1 and 2, but show a modification of the pitch sequence;

Fig. 10 shows the modified pitch sequence divided into three groups or segments of eleven units each, and shows by the numerals the relative value or size of the units; and, Figs. 11 and 12 are diagrammatic illustrations of the manner in which the modified pitch sequence groups are arranged as segments in the male and female halves of the mold.

From the standpoint of eliminating or reducing noise or apparent noise, the novel characteristics of the improved pitch sequences of the invention may be stated in the following rules:

(1) No more than two successive units of a sequence can have the same length within 4% (based on the length of the smallest unit) of each other. Stated in another way, any three or more successive units must have lengths which differ from each other by at least 4%.

(2) In any sub-group of four successive units, the difference between the maximum and minimum length must be at least 16% of the average length of the units in that sub-group.

(3) In any fifth of the tire circumference, the average length of the units present must equal the average length present in any other fifth of the tire, to within 5%.

We have most unexpectedly discovered that the observance of the foregoing unobvious rules results in sounds whose repetitions are relatively difficult to distinguish by ear, and in sounds having poorly defined pitch qualities to the ear. These properties are particularly effective in obscuring a noise in a random background of noises, as in the case of tire noise heard from a moving car. Improved pitch sequences I and II described above are typical specific examples of the application of the foregoing rules, as will be made clear in all detail below.

Typical embodiments of the invention will now be described in detail, with particular reference to the reversability feature which makes it possible to construct the tire mold economically, as well as with reference to the improved noise-eliminating aspect.

Referring to the drawings, a typical pneumatic tire of the invention has a tread, a considerable portion 10 of which is represented in plan view in Figs. 1 and 2, that is symmetrically divided into an upper or male half 11 and a lower or female half 12 along a transaxial central plane 13. The tread 10 has seven circumferentially extending ribs 14, separated by generally circumferential grooves 15, 16. The ribs may be regarded as divided transversely into repeating design units 17 of similar appearance, but varying circumferential lengths. Such transverse divisions or units of the tread design are achieved by curving the tread grooves 15, 16 or, stated in another way, by curving or scalloping the side walls of the circumferential ribs 14. Thus, in each design unit 17, certain of the grooves (designated by the identifying numeral 15) describe a single curve or arc 18, while certain other of the grooves (designated by the identifying numeral 16) described in the same distance two smaller equal curves or arcs 19, 20.

The variation in the relative size of circumferential length of the design units 17 follows the improved pitch sequence designated as pitch sequence I above, and the arrangement of this sequence for the entire tire tread, in both the male and female halves, is represented in Figs. 3 and 4. The letters A, B, C and D in Figs. 1–4 identify the basic groups making up this sequence.

Although the absolute values of the length or circumferential distance in each design unit may vary considerably in practice, it is preferable that the ratio of the largest unit to the smallest unit be between 1.2 and 3.0, in order to provide a tire that gives a desirable appearance of substantially uniform design to the casual observer, and it is also preferable that the average length of the units be between one inch and one-third inch, for passenger car size tires for ordinary use. It will be noted that the preferred pitch sequence I contains 32 units, divided into four even groups of eight units each.

As pointed out previously, and as will be evident from Figs. 1 and 2, the pitch sequence groups may be divided into pairs which are the reverse of each other, or mirror images of each other, as follows: AD; BC; CB; and DA. It will also be seen from inspection of Figs. 1 and 2 that the upper half 11 of the tread (formed in the male half of the mold, is the reverse or mirror image of the lower half 12 of the tread (formed in the female half of the mold). In any given segment of the tread, the upper and lower halves are formed of pitch sequence groups which are mirror images of each other.

In Figs. 5 and 6, there is represented an arrangement of the pitch sequence groups in the upper or male half of the mold and also in the lower or female half of the mold. Each pitch sequence group represents a segment of the mold half. There are only four different groups, A, B, C and D, and it therefore follows that the entire mold, including both the male half and the female half, can be constructed using only four different kinds of model segments.

It will be apparent that the male half of the mold shown in Fig. 5 can be inverted on top of the female half of the mold shown in Fig. 6, and when the two mold halves are thus brought together the aligned segments of the male and female halves will in every case constitute a pair of segments that are the reverse or mirror images of each other. This effect is observable also by comparing the upper and lower halves 11, 12 of the tire tread as shown in Figs. 1 and 2. Thus, it will be seen that the entire tire mold has been constructed from a relative few different kinds of segments, even though the tire tread as a whole embodies a pitch sequence that avoids any undesirable repetition.

A more detailed analysis of this embodiment of the invention will show how it applies the three general rules set forth above. Thus, considering rule 1 (no more than two successive units of a sequence can have the same length within 4% of each other), we have in the typical subsequence A, unit lengths 9, 10, 11, 12, 10, 11, 12, 13. The largest difference in groups of three units is two integers; that is, between 12 and 10. The smallest difference in groups of three between two units is one integer; that is, between 12 and 13. Percentagewise these are 16.7% (2 is 16.7% of 12) and 8.3% (1 is 8.3% of 12), respectively, both greater than the 4% indicated in rule 1.

Considering now rule 2 (in sub-groups of four units, the difference between the maximum and minimum length must be at least 16% of the average length in that subgroup), typical sequences of adjoining units are 9, 10, 11, 12; 12, 13, 12, 11; 9, 11, 12, 13. The averages are respectively "10.5," "12," and "11.25." The maximum variations of length in each group are respectively 3, 2, 4 or 28.5%, 16.7% and 35.5%. In all cases, this is greater than 16% of the average of the group of four.

With regard to rule 3 (in any fifth of the tire circumference, the average length equals, within 5%, the average length in any other fifth): Note that groups A, B, C, and D of each constitute 1/10 of the tire circumference. All have eight units which average "11." Any fifth of the tire circumference, consisting of any two complete groups, contain exactly 16 units. Consequently, any fifth of the circumference, which contains two complete groups A-B; C-D; etc., has the same number of units as any other fifth so chosen. Since these pairs of groups which constitute one-fifth of the circumference of the tire are exactly the same, they are within the 5% allowed by rule 3. If on the other hand, the fifth of the circumference is so chosen that it contains parts of three groups, i.e., the last half of A, all of B, and the first half of C, there will be less than one-half of an average unit (11) difference in this mixed group from the groups previously mentioned. This is less than 3.1% deviation and is acceptable since it is less than 5%.

Concerning the modification of the invention shown in Figs. 7–12, this form employs the pitch sequence II described previously, which is similar to the pitch sequence I to the extent that it also employs combinations of units which have the relative values 9, 10, 11, 12 and 13. However, the pitch sequence II contains a total of 33 units, which are divided into three groups of eleven units each. It will be apparent that the groups in the following pairs are the reverse or mirror images of each other: XZ; YY; and ZX. The manner in which these pairs are disposed in the modified tire tread 25 is represented in Figs. 7–9. This is also shown schematically in Fig. 10. In Figs. 11 and 12, the manner in which the three groups X, Y, Z are utilized to provide the segments for both the male half and the female half of the mold is shown. The entire mold represented by Figs. 11 and 12 can therefore be constructed with relative ease and economy from only three different kinds of segment models.

The pitch sequence II can be analyzed similarly to the pitch sequence I, whereupon it will appear that the sequence II also conforms to the rules 1, 2 and 3 set forth above. In general, the invention in one aspect contemplates any and all pitch sequences conforming to these rules, which are believed to define an entirely novel set of conditions that are responsible for a major improvement from the standpoint of noise.

From the foregoing it will be apparent that the invention is highly advantageous in that it makes it possible to provide an improved kind of variable pitch sequence, in an arrangement that makes it possible to mold the tire in a tire mold that is constructed from a relative few, for example 3 or 4, different kinds of mold segments, because of the manner in which the pitch sequence is reversible as a whole and therefore divisible into groups that form mirror image pairs. The unusual effectiveness of the described pitch sequences in reducing apparent noise has been amply demonstrated by actual tests on tires embodying such pitch sequences. In this way, it was clearly demonstrated that the described pitch sequences are remarkably superior to the best known previously proposed pitch sequences.

Having thus described our invention, what we claim and desire to protect by Letters Patent is:

1. A pneumatic tire having a tread pattern made up of a plurality of repeating design units each varying successively in relative size according to a particular sequence, said sequence conforming to the following rules: (1) Any three or more successive units must have lengths which differ from each other by at least 4%; (2) Considering any four successive units, the difference between the maximum and minimum length must be at least 16% of the average length of said four units; and (3) In any fifth of the tire circumference the units present must equal the average length present in any other fifth of the tire, to within 5%.

2. A pneumatic tire having a tread pattern made up of a plurality of repeating design units varying successively in relative size according to a particular sequence, said sequence conforming to the following rules: (1) Any three or more successive units must have lengths which differ from each other by at least 4%; (2) Considering any four successive units, the difference between the maximum and minimum length must be at least 16% of the average length of said four units; and (3) In any fifth of the tire circumference the units present must equal the average length present in any other fifth of the tire, to within 5%, the said sequence being the same in either direction.

3. A pneumatic tire having a tread comprised of a plurality of circumferential ribs, said ribs being interrupted transversely at intervals to provide repeating units of an anti-skid design, the said units being of varying circumferential lengths in accordance with a definite sequence, to minimize sound produced by the tire when in use, said sequence being made up of repeating groups which are mirror images of each other, whereby each transaxial half of the tire may be molded in cooperating mating respective male and female mold halves comprised of a minimum number of dissimilar segments, said sequence conforming to the following rules: (1) Any three or more successive units must have lengths which differ from each other by at least 4%; (2) Considering any four successive units, the difference between the maximum and minimum length must be at least 16% of the average length of said four units; and (3) In any fifth of the tire circumference the units present must equal the average length present in any other fifth of the tire, to within 5%.

4. A pneumatic tire having a tread pattern made up of units of sequentially varying lengths in the following proportions: 9, 10, 11, 12, 10, 11, 12, 13, 12, 11, 10, 9, 11, 12, 13, 10, 10, 13, 12, 11, 9, 10, 11, 12, 13, 12, 11, 10, 12, 11, 10, 9.

5. A pneumatic tire having a tread pattern made up of units of sequentially varying lengths in the following proportions: 9, 10, 11, 12, 10, 11, 12, 13, 12, 11, 10, 9, 11, 12, 13, 9, 13, 9, 13, 12, 11, 9, 10, 11, 12, 13, 12, 11, 10, 12, 11, 10, 9.

References Cited in the file of this patent
UNITED STATES PATENTS

| | | |
|---|---|---|
| 2,006,197 | Ewart | June 25, 1935 |
| 2,124,821 | Hubach | July 26, 1938 |
| 2,255,994 | Bush | Sept. 16, 1941 |
| 2,612,928 | Buddenhagen | Oct. 7, 1952 |
| 2,642,914 | Palko et al. | June 23, 1953 |